United States Patent
Marcellino

(10) Patent No.: US 10,051,794 B2
(45) Date of Patent: Aug. 21, 2018

(54) CUTTING TOOL AND A METHOD FOR PLANTS GRAFTING

(71) Applicant: CENTRO SEIA S.R.L. SOCIETA' AGRICOLA, Ragusa (IT)

(72) Inventor: Filippo Marcellino, Ragusa (IT)

(73) Assignee: CENTRO SEIA S.R.L. SOCIETA' AGRICOLA, Ragusa (IT)

( * ) Notice: Subject to any disclaimer, the term of this patent is extended or adjusted under 35 U.S.C. 154(b) by 113 days.

(21) Appl. No.: 14/652,769

(22) PCT Filed: Dec. 12, 2013

(86) PCT No.: PCT/IB2013/060872
§ 371 (c)(1),
(2) Date: Jun. 16, 2015

(87) PCT Pub. No.: WO2014/102645
PCT Pub. Date: Jul. 3, 2014

(65) Prior Publication Data
US 2015/0366142 A1    Dec. 24, 2015

(30) Foreign Application Priority Data
Dec. 24, 2012  (IT) ................ FI2012A0294

(51) Int. Cl.
*A01G 1/06*  (2006.01)
*A01G 3/00*  (2006.01)
(Continued)

(52) U.S. Cl.
CPC ............. *A01G 1/06* (2013.01); *A01G 2/30* (2018.02); *A01G 3/00* (2013.01); *A01G 22/00* (2018.02)

(58) Field of Classification Search
CPC .......... B26B 13/04; A01G 1/06; A01G 1/001; A01G 2001/065; A01G 2003/005;
(Continued)

(56) References Cited

U.S. PATENT DOCUMENTS

| 854,915 A | * | 5/1907 | Speece | ................ B24D 15/105 30/331 |
| 870,096 A | * | 11/1907 | Haley | ..................... A01G 1/06 47/7 |

(Continued)

FOREIGN PATENT DOCUMENTS

| DE | 80092 | 8/1894 |
| DE | 142233 | 2/1902 |

(Continued)

OTHER PUBLICATIONS

PCT International Search Report dated Mar. 3, 2014 for PCT/IB2013/060872 filed on Dec. 12, 2013 in the name of Centro Seia S.R.L. Societa' Agricola.

(Continued)

*Primary Examiner* — Tien Q Dinh
*Assistant Examiner* — Ebony E Evans
(74) *Attorney, Agent, or Firm* — Steinfl + Bruno LLP

(57) ABSTRACT

Grafting tools for use in agriculture, nurseries, or horticulture, that ensure the sterile cutting of the plant during grafting operations and that prevent the spreading of diseases through the blade, are described.

6 Claims, 1 Drawing Sheet

(51) Int. Cl.
*A01G 2/30* (2018.01)
*A01G 22/00* (2018.01)

(58) Field of Classification Search
CPC .. A01G 2005/005; B23B 27/02; B23B 27/06; B23B 27/14
USPC ......... 30/149, 150, 123, 342, 344, 169, 254, 30/340, 343, 346, 348, 357; 47/6, 7, 8; 294/50.8, 50.9, 131
See application file for complete search history.

(56) References Cited

U.S. PATENT DOCUMENTS

| | | | | |
|---|---|---|---|---|
| 1,026,034 A * | 5/1912 | Hanel | A21B 3/003 | 294/49 |
| 1,055,044 A * | 3/1913 | Hollander | A01B 1/022 | 137/901 |
| 1,500,402 A * | 7/1924 | Lewis | B26B 5/00 | 279/105.1 |
| 1,625,072 A * | 4/1927 | Behrman | D03D 39/24 | 139/44 |
| 1,649,318 A | 11/1927 | Miller | | |
| 1,823,159 A * | 9/1931 | Moure | A21B 3/003 | 294/7 |
| 1,913,800 A * | 6/1933 | Farquhar | A01B 1/16 | 294/50.7 |
| 2,070,495 A * | 2/1937 | Strutz | A47G 19/2222 | 138/106 |
| 2,448,957 A * | 9/1948 | Ciarlone | B26B 5/00 | 279/97 |
| 2,696,294 A * | 12/1954 | Tarnay | B25F 1/00 | 206/372 |
| 2,826,863 A * | 3/1958 | Aliengena | A01G 1/06 | 30/294 |
| 3,321,783 A * | 5/1967 | Ivan | B25F 1/04 | 16/422 |
| 3,592,272 A * | 7/1971 | Perez | A01B 1/20 | 172/375 |
| 3,704,779 A * | 12/1972 | Nigg | A47G 19/06 | 206/223 |
| 3,899,850 A * | 8/1975 | Gluck | A01G 9/1086 | 47/47 |
| 3,925,890 A * | 12/1975 | Frodsham | A47G 21/181 | 229/401 |
| 4,203,213 A * | 5/1980 | Mollica | B26B 3/02 | 30/343 |
| 4,862,591 A * | 9/1989 | Barringer | A01K 97/01 | 30/164.8 |
| 5,581,889 A * | 12/1996 | Reuter | A01B 1/08 | 172/378 |
| 6,311,783 B1 * | 11/2001 | Harpell | A01B 1/08 | 172/371 |
| 6,371,324 B1 * | 4/2002 | Torniainen | B65D 51/246 | 206/541 |
| 6,550,207 B1 | 4/2003 | Pontarolo | | |
| 6,568,087 B1 * | 5/2003 | Gringer | B23D 71/04 | 15/236.01 |
| 8,833,220 B1 * | 9/2014 | Powers, II | B26D 1/0006 | 83/622 |
| D720,583 S * | 1/2015 | Hyp | | D8/9 |
| D811,034 S * | 2/2018 | Kent | | D32/54 |
| 2011/0219631 A1 * | 9/2011 | Hou et al. | A47G 19/02 | 30/322 |
| 2012/0047659 A1 * | 3/2012 | Murphy | B25F 1/00 | 7/116 |
| 2014/0157607 A1 * | 6/2014 | McFarland | B26B 9/02 | 30/355 |

FOREIGN PATENT DOCUMENTS

FR 450765 4/1913
GB 2140718 12/1984

OTHER PUBLICATIONS

PCT Written Opinion dated Mar. 3, 2014 for PCT/IB2013/060872 filed on Dec. 12, 2013 in the name of Centro Seia S.R.L. Societa' Agricola.

* cited by examiner

CUTTING TOOL AND A METHOD FOR PLANTS GRAFTING

CROSS REFERENCE TO RELATED APPLICATIONS

The present application is the US national stage of International Patent Application PCT/IB2013/060872 filed internationally on Dec. 12, 2013 which, in turn, claims priority to Italian Patent Application No. FI2012A000294 filed on Dec. 24, 2012.

FIELD OF THE INVENTION

The present invention concerns the field of cutting tools, in particular a grafting tool for use in agriculture, horticulture or plant nursery. In particular the invention concerns a disposable cutting tool that is provided with a safety system for preventing the reuse of the blade on several plants.

STATE OF THE ART

As it is known, grafting is an agronomic practice that consists of joining two plants by using the root part of a first plant called "rootstock", and the aerial part of a second plant called "scion", so as to obtain a single entity, which constitutes the grafted plant. This grafted plant has all the productive characteristics of the scion, for example in terms of the type and quality of the fruit, but at the same time it also has the characteristics of the root apparatus of the rootstock, firstly the resistance to different soil diseases.

While grafting has been widely used for centuries in arboriculture, it has been used a lot less in horticulture. However, recently, there has been an exponential increase in grafted horticulture plants, especially due to the spreading of "IPM" (Integrated Pest Management) systems, which are becoming increasingly more common and that have the purpose of minimizing the use of chemical products for eliminating both animal and vegetable pathogens through the use of alternative measures. A plant that has been suitably grafted is indeed naturally resistant to soil diseases, therefore the amount of chemical pesticide treatments necessary for producing healthier and more productive plants is certainly much less than a cultivation in which the same plants have not been grafted.

In particular, among horticulture plants, the tomato is the plant that over the last years recorded the highest increase of grafting so as to overcome the impossibility of using some specific chemical products that were conventionally used for treating the soil, due to new stricter standards concerning the cultivation of tomatoes.

Grafted tomato plants are produced in specialised nurseries before being transplanted in a field, according to a production cycle that can be summarised as follows:
- the rootstock, a wild tomato hybrid, and the scion, the tomato that is desired to be grown, are sown and cultivated in alveolar containers;
- the scion and rootstock are cut by means of blades by a worker;
- the aerial part of the scion and the root part of the rootstock are joined, generally through suitable silicone clips, and the plant obtained is kept at controlled temperature and humidity so as to make the tissues heal and join the lymphatic vessels;
- the grafted plant is cultivated in a nursery until a suitable growth stage has been reached and is then transplanted in a field.

Unfortunately the tomato seed, both of the scion and of the rootstock, can be a carrier of very harmful bacterial diseases; the cutting of the plants through grafting, one after the other in the alveolar containers, can spread the disease if this is carried out with a same blade, leading to the production of sick plants that, once transplanted in the field, could create enormous problems. Some of these bacterial diseases, moreover, do not create phenomena that are visible on the plant when cultivating in the nursery, but develop only later in a field, thus causing even greater damage since many resources were already been spent in order to reach the last cultivation phase.

In order to limit the spreading of diseases due to grafting cutting it is necessary to use a different blade for each plant, but it is practically impossible to verify whether or not this is indeed being done by the workers.

It is therefore still strongly desired, in particular in the field of horticulture, to have a safe grafting procedure, that offers the guarantee of not spreading diseases amongst plants of the same cultivation, due to carrying out the grafting of many plants with the same blade.

The UK patent application GB 2 140 718 describes a disposable cutting tool.

SUMMARY OF THE INVENTION

The Applicant has now devised a new cutting tool for plants grafting, in particular horticulture plants, more specifically tomato plants, provided with a particular configuration that makes it possible to implement a grafting procedure that is safe and effective, and especially to avoid the spreading of diseases from one plant to another.

Subject of the present invention is therefore a disposable cutting tool for plants grafting comprising a body provided with an edge having at least a cutting portion, said body being removably connected to an end of a rod.

A further subject of the invention is a method for plants grafting comprising a step of cutting the plants portions to be grafted with a disposable cutting tool comprising a body provided with an edge having at least a cutting portion, said body being removably connected to an end of a rod, said cutting step being followed by a step in which said rod is separated from said body having a cutting edge, and located in the proximity of the grafted plant, while said body having a cutting edge, already used for grafting, is thrown away.

As explained in greater detail in the rest of the description, the tool and the method subject of the invention make it possible to overcome the drawbacks highlighted above of current grafting procedures, by providing the means for an effective and at the same time safe grafting, thanks to the use of a tool with a cutting edge the use of which is inevitably restricted to a single plant, thus avoiding the spreading of bacterial diseases from one plant to another through the use of a same blade.

Such results are achieved with the tool according to the present invention, whose essential characteristics are defined by the first of the attached claims, whereas further important characteristics are defined in the following dependent claims.

BRIEF DESCRIPTION OF THE DRAWINGS

The characteristics and the advantages of the tool according to the present invention shall become clearer from the following description of an embodiment thereof, given as an example and not for limiting purposes, with reference to the attached drawings in which.

DETAILED DESCRIPTION OF THE INVENTION

Figure 1A:
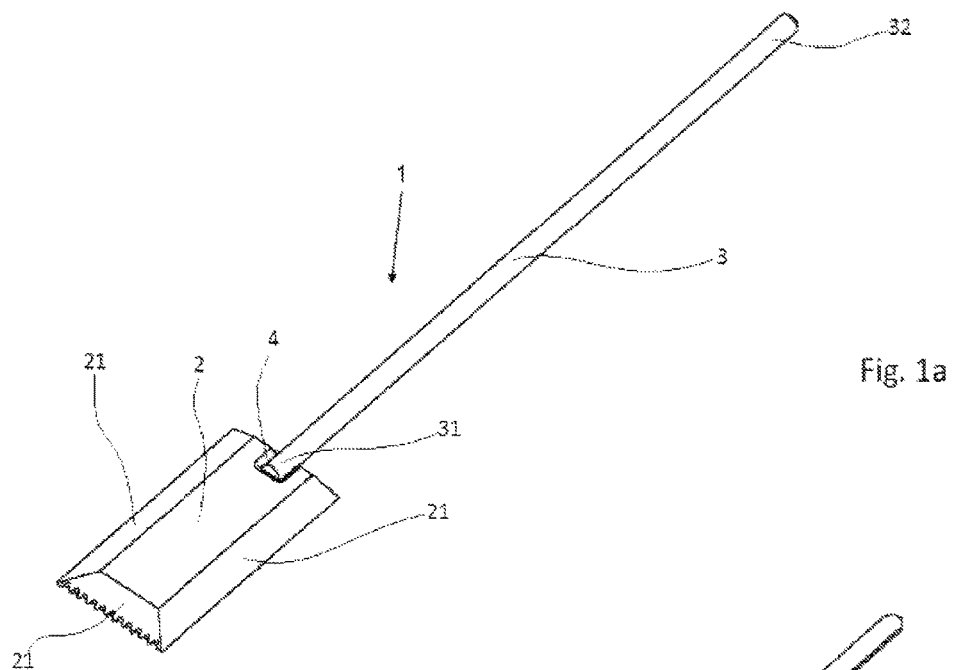
FIGS. 1a and 1b schematically show the tool of the invention, in a perspective view from above and from below, respectively.

With reference to the above said FIGURE, the present invention lies in the particular configuration of the present tool 1, in which a body 2 is removably connected to a substantially cylindrical rod 3, through its end 31, the other end 32 of the rod being free.

At least a portion 21 of the edge of the body 2 is a cutting portion, or it is in any case provided with a blade that is suitable for cutting plants for grafting them. Such a cutting edge can be smooth, undulated or jagged. Preferably, according to the invention, two distinct cutting portions of the edge of the body 2 are present, one intended for cutting the scion and the other the rootstock. According to a particularly preferred embodiment of the invention, illustrated in FIGS. 1a and 1b, the body 2 has a substantially rectangular flat shape, with the two major lateral edges in the form of smooth cutting edge respectively for cutting the scion and the rootstock to be grafted to one another so as to create the new grafted plant; again with reference to the FIGURES the minor edge, opposite to the rod, can be in the form of a jagged cutting edge.

According to a particular embodiment of the invention, the end 31 of the rod 3 is connected to the body 2 with which it forms a single body in plastic material that is obtained by extrusion, and the removable connection is achieved by means of a pre-breaking cut. This particular embodiment allows the worker to carry out the separation between the body with the cutting edges and the rod in an extremely simple and quick manner. As illustrated in FIG. 1b, the body 2 has a rear surface 22 that is substantially flat, whereas the front surface has at least a bevelled edge so as to form the cutting edge for cutting the plant to be grafted.

Figure 1B:
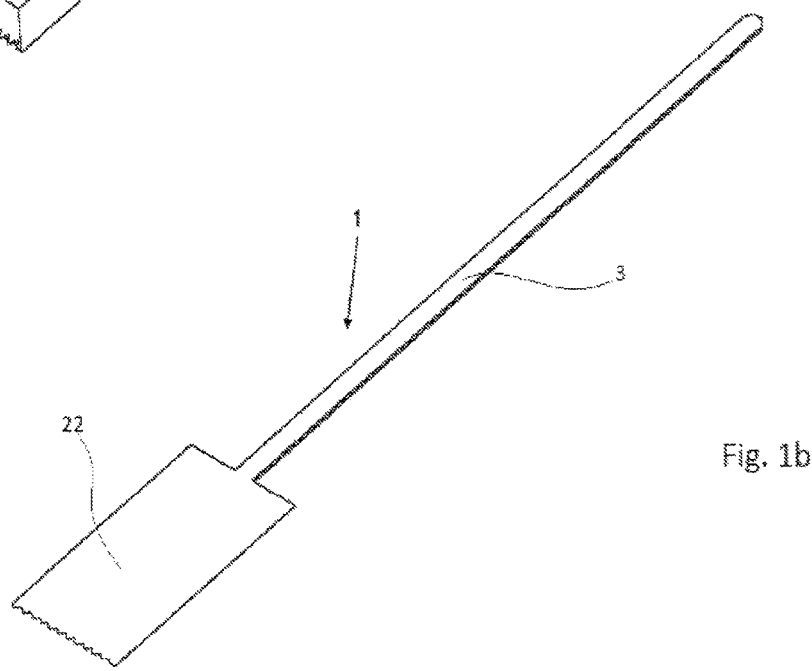

Alternative embodiments of the invention, like for example the one represented in FIGS. 1a and 1b, can on the other hand foresee the rod 3 being connected to the body 2 through snap-fitting of the rod in an appropriate housing 4 obtained in the body 2 in a central position on the non-cutting edge, so that the rod can be easily gripped by the worker who must carry out the grafting leaving the cutting edges free on the body 2 for cutting the plant. Once the two portions of the plant have been cut and grafted, the rod 3 is removed from the housing 4 or they are in any case separated from the body 2 with the cutting edges, which is thrown away. The rod 3, thus separated from the body 2, is inserted in the ground adjacent to the plant that has just been grafted, thus acting as a signal for the worker that the grafting procedure has finished. The rod 3 can moreover be placed so as to also carry out a support stake function for the grafted plant during the following steps of rooting and cultivation in a vase before it is transferred for the final phase of cultivation in the field.

It is evident that, thanks to the present grafting procedure with the tool described above, plants that have already been grafted but do not have a rod must be eliminated from the cultivation since it is highly probable that they have been grafted with a blade that has already been used for another plant. On the other hand, plants that have already been grafted and have a rod inserted in the adjacent ground will offer greater guarantee of having been cut with a blade that was not previously used.

The present invention thus provides a solution that is effective for the technical problems outlined above, related to the usual grafting procedure with conventional tools, by providing a tool that is technically very simple to use and to make, also having low costs, which makes it possible to actuate a grafting procedure that is extremely safer than those carried out today with known tools, preventing in particular diseases from being spread from one plant to another.

The tool according to the invention can be made in different materials as long as they are suitable for the use described above, and in particular it is made in extrudable plastic material. In the present tool there can be a variety of shapes of the body 2 provided with cutting edges so long as it is suitable for the use as a blade for cutting plants, whereas the rod 3 has an elongated shape, for example substantially cylindrical, suitable for being gripped by a worker while cutting with the body having cutting edges, and for its subsequent use as a tutor for the grafted plant.

The present invention has been described so far with reference to its preferred embodiments. It should be understood that there can be other embodiments that belong to the same inventive core, all covered in the scope of protection of the following claims.

The invention claimed is:

1. A cutting tool for grafting plants, comprising:
    a substantially rectangular body including a rear surface being substantially flat, the body further including a front surface having a medial flat portion tapering laterally towards the rear surface at a first lateral side to provide a first major lateral cutting edge, the medial flat portion tapering laterally towards the rear surface at a second lateral side to provide a second major lateral cutting edge opposite the first major lateral cutting edge, and the medial flat portion tapering towards the rear surface at a front side to provide a minor cutting edge between the first major lateral cutting edge and the second major lateral cutting edge; and
    an elongated rod having a first side with an arcuate shape and a second side being substantially flat, the rod further having a first rod end and a second rod end positioned at a rear side of the medial flat portion being opposite the front side of the medial flat portion and between the first major lateral cutting edge and the second major lateral cutting edge,
        wherein a recess is formed at a back side of the body being opposite to the front side of the body and between the first major lateral cutting edge and the second major lateral cutting edge, the recess being configured to provide a removable connection between the body and the second rod end, and
        wherein the second side of the rod is flush with the rear surface of the body.

2. The cutting tool according to claim 1, wherein each of the first and second major lateral cutting edges is in the form of a smooth, undulated or jagged cutting edge, and the minor cutting edge is in the form of a jagged cutting edge.

3. The cutting tool according to claim 1, wherein the second rod end is removably connected to the body by snap-fit at the back side of the body.

4. A method for grafting plants, comprising:
    providing the cutting tool of claim 1;
    cutting portions of plants using one of the first major lateral cutting edge, the second major lateral cutting edge or the minor cutting edge; and
    removing the rod from the body.

5. The method according to claim 4, further including placing the rod so as to support a grafted plant formed from the portions of plants.

6. The method according to claim 4, wherein the cutting portions of plants is conducted by cutting a scion and a rootstock to be joined to form the grafted plant using one or more of the first major lateral cutting edge, the second major lateral cutting edge and the minor cutting edge.

* * * * *